(12) United States Patent
Niu et al.

(10) Patent No.: US 7,413,723 B2
(45) Date of Patent: Aug. 19, 2008

(54) METHODS OF OXIDIZING MULTIWALLED CARBON NANOTUBES

(75) Inventors: Chunming Niu, Lexington, MA (US); David Moy, Winchester, MA (US); Asif Chishti, Lowell, MA (US); Robert Hoch, Hensonville, NY (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 11/271,422

(22) Filed: Nov. 9, 2005

(65) Prior Publication Data

US 2006/0239891 A1    Oct. 26, 2006

Related U.S. Application Data

(63) Continuation of application No. 10/857,470, filed on May 28, 2004, now abandoned, which is a continuation of application No. 09/358,745, filed on Jul. 21, 1999, now abandoned.

(51) Int. Cl.
B82B 3/00 (2006.01)
(52) U.S. Cl. .................. 423/447.3; 423/447.1; 423/460; 977/847
(58) Field of Classification Search .............. 423/447.1, 423/447.3, 460; 977/847
See application file for complete search history.

(56) References Cited

U.S. PATENT DOCUMENTS

| | | | |
|---|---|---|---|
| 4,009,305 A | 2/1977 | Fujimaki et al. | |
| 4,013,751 A | 3/1977 | Davis et al. | |
| 4,154,704 A | 5/1979 | Vinton et al. | |
| 4,329,260 A | 5/1982 | Lester et al. | |
| 4,518,575 A | 5/1985 | Porter et al. | |
| 4,572,813 A | 2/1986 | Arakawa | |
| 4,583,299 A | 4/1986 | Brooks | |
| 4,642,125 A | 2/1987 | Burk | |
| 4,663,230 A | 5/1987 | Tennent | |
| 4,816,289 A | 3/1989 | Komatsu | |
| 4,855,091 A | 8/1989 | Geus | |
| 4,992,332 A | 2/1991 | Kamei et al. | |
| 4,997,804 A | 3/1991 | Pekala | |
| 5,081,163 A | 1/1992 | Pekala | |
| 5,110,693 A | 5/1992 | Friend et al. | |
| 5,165,909 A | 11/1992 | Tennent et al. | |
| 5,171,560 A | 12/1992 | Tennent et al. | |
| 5,238,568 A | 8/1993 | Fely et al. | |
| 5,346,683 A | 9/1994 | Green et al. | |
| 5,409,683 A | 4/1995 | Tillotson et al. | |
| 5,439,864 A | 8/1995 | Rosen et al. | |
| 5,456,897 A | 10/1995 | Moy et al. | |
| 5,458,784 A | 10/1995 | Baker et al. | |
| 5,494,940 A | 2/1996 | Unger et al. | |
| 5,500,200 A | 3/1996 | Mandeville et al. | |
| 5,569,635 A | 10/1996 | Moy et al. | |
| 5,611,964 A | 3/1997 | Friend et al. | |
| 5,626,650 A | 5/1997 | Rodriguez et al. | |
| 5,641,466 A | 6/1997 | Ebbesen et al. | |
| 5,681,657 A | 10/1997 | Frey et al. | |
| 5,691,054 A | 11/1997 | Tennent et al. | |
| 5,707,916 A | 1/1998 | Snyder et al. | |
| 5,747,161 A | 5/1998 | Iijima | |
| 5,780,101 A | 7/1998 | Nolan et al. | |
| 5,800,706 A | 9/1998 | Fischer | |
| 5,863,654 A | 1/1999 | Frey et al. | |
| 5,866,434 A | 2/1999 | Massey et al. | |
| 6,031,711 A | 2/2000 | Tennent et al. | |
| 6,099,960 A | 8/2000 | Tennent et al. | |
| 6,099,965 A | 8/2000 | Tennent et al. | |
| 6,159,742 A | 12/2000 | Lieber et al. | |
| 6,203,814 B1 | 3/2001 | Fisher et al. | |
| 6,683,783 B1 * | 1/2004 | Smalley et al. ............... | 361/502 |
| 6,696,387 B1 | 2/2004 | Moy et al. | |

FOREIGN PATENT DOCUMENTS

| | | |
|---|---|---|
| WO | WO86/03455 | 6/1986 |
| WO | WO89/07163 | 8/1989 |
| WO | WO90/07023 | 6/1990 |
| WO | WO91/05089 | 4/1991 |
| WO | WO95/07316 | 3/1995 |

OTHER PUBLICATIONS

Baker and Harris, Chemistry and Physics of Carbon, Walker and Thrower ed., vol. 14, p. 83, (1978).
Ebbesen, et al., Nature, 358, pp. 220-222, (1992).
Endo et al., J of Crystal Growth, vol. 32, pp. 335-349, (1976).
Hoogenvaad, M.S. et al. ("Metal Catalysts supported on a Novel Carbon Support", presented at Sixth International Conference on Scientific Basis for the Preparation of Heterogeneous Catalysts, Belgium, (1994).
Iijima, Nature, 354, 56, (1991).
Rodriquez, N., J. Mater. Research, vol. 8, p. 3233 (1993).
Weaver, Science, 265, (1994).
U.S. Appl. No. 08/812,856, filed Mar. 6, 1997 to Fischer et al.

* cited by examiner

*Primary Examiner*—Stuart Hendrickson
(74) *Attorney, Agent, or Firm*—Kramer Levin Naftalis Frankel LLP; Barry Evans, Esq.

(57) ABSTRACT

Methods of oxidizing multiwalled carbon nanotubes are provided. The multiwalled carbon nanotubes are oxidized by contacting the carbon nanotubes with gas-phase oxidizing agents such as $CO_2$, $O_2$, steam, $N_2O$, $NO$, $NO_2$, $O_3$, and $ClO_2$. Near critical and supercritical water can also be used as oxidizing agents. The multiwalled carbon nanotubes oxidized according to methods of the invention can be used to prepare rigid porous structures which can be utilized to form electrodes for fabrication of improved electrochemical capacitors.

51 Claims, 3 Drawing Sheets

FIGURE 2
FIGURE 3
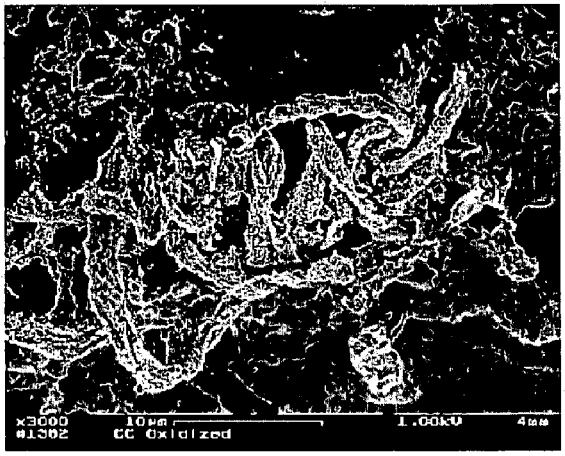
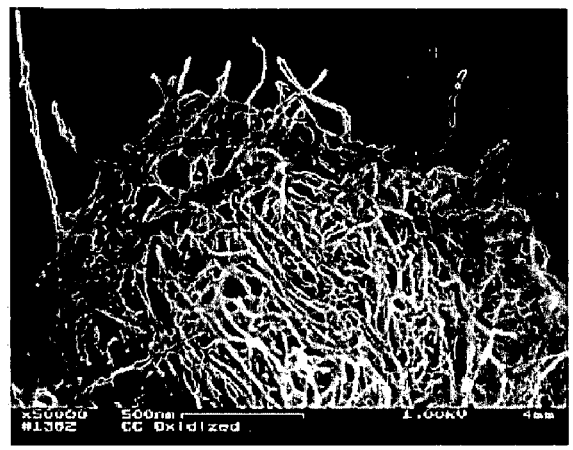
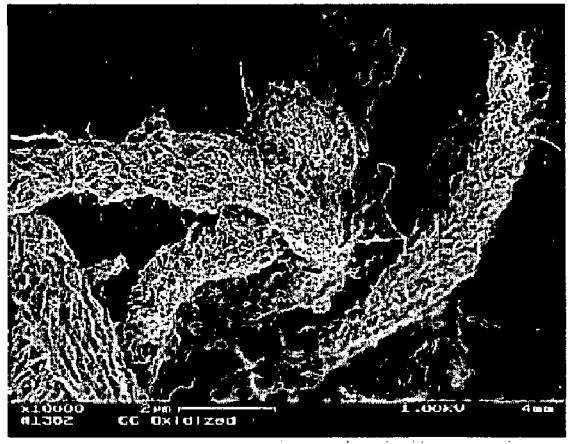
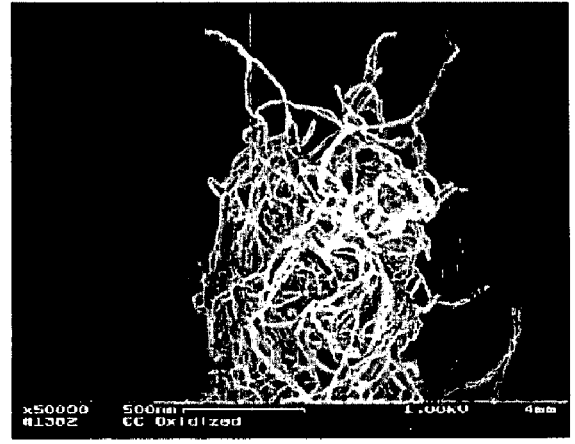
FIGURE 4
FIGURE 5

METHODS OF OXIDIZING MULTIWALLED CARBON NANOTUBES

This is a continuation of U.S. application Ser. No. 10/857,470, filed May 28, 2004, which is a continuation of U.S. application Ser. No. 09/358,745, now abandoned, filed Jul. 21, 1999, all of which are hereby incorporated by reference in their entirety.

BACKGROUND OF THE INVENTION

1. Field of Invention

The invention relates broadly to methods of oxidizing the surface of multiwalled carbon nanotubes. The invention also encompasses methods of making aggregates of surface-oxidized nanotubes, and using the same. The invention also relates to complex structures comprised of such surface-oxidized carbon nanotubes linked to one another.

2. Description of the Related Art

Carbon Nanotubes

This invention lies in the field of submicron graphitic carbon fibrils, sometimes called vapor grown carbon fibers or nanotubes. Carbon fibrils are vermicular carbon deposits having diameters less than $1.0\mu$, preferably less than $0.5\mu$, and even more preferably less than $0.2\mu$. They exist in a variety of forms and have been prepared through the catalytic decomposition of various carbon-containing gases at metal surfaces. Such vermicular carbon deposits have been observed almost since the advent of electron microscopy. (Baker and Harris, *Chemistry and Physics of Carbon*, Walker and Thrower ed., Vol. 14, 1978, p. 83; Rodriguez, N., *J. Mater. Research*, Vol. 8, p. 3233 (1993)).

In 1976, Endo et al. (see Obelin, A. and Endo, M., *J. of Crystal Growth*, Vol. 32 (1976), pp. 335-349), hereby incorporated by reference, elucidated the basic mechanism by which such carbon fibrils grow. They were seen to originate from a metal catalyst particle, which, in the presence of a hydrocarbon containing gas, becomes supersaturated in carbon. A cylindrical ordered graphitic core is extruded which immediately, according to Endo et al., becomes coated with an outer layer of pyrolytically deposited graphite. These fibrils with a pyrolytic overcoat typically have diameters in excess of $0.1\mu$, more typically 0.2 to $0.5\mu$.

In 1983, Tennent, U.S. Pat. No. 4,663,230, hereby incorporated by reference, describes carbon fibrils that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than $0.1\mu$ and length to diameter ratios of at least 5. Desirably they are substantially free of a continuous thermal carbon overcoat, i.e., pyrolytically deposited carbon resulting from thermal cracking of the gas feed used to prepare them. Thus, the Tennent invention provided access to smaller diameter fibrils, typically 35 to 700 Å (0.0035 to $0.070\mu$) and to an ordered, "as grown" graphitic surface. Fibrillar carbons of less perfect structure, but also without a pyrolytic carbon outer layer have also been grown.

The carbon nanotubes which can be oxidized as taught in this application, are distinguishable from commercially available continuous carbon fibers. In contrast to these fibers which have aspect ratios (L/D) of at least $10^4$ and often $10^6$ or more, carbon fibrils have desirably large, but unavoidably finite, aspect ratios. The diameter of continuous fibers is also far larger than that of fibrils, being always $>1.0\mu$ and typically 5 to $7\mu$.

Tennent, et al., U.S. Pat. No. 5,171,560, hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than $0.1\mu$ and length to diameter ratio of greater than 5. These fibrils can be oxidized by the methods of the invention.

When the projection of the graphitic layers on the nanotube axis extends for a distance of less than two nanotube diameters, the carbon planes of the graphitic nanotube, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These carbon nanotubes are also useful in the practice of the invention.

Carbon nanotubes of a morphology similar to the catalytically grown fibrils described above have been grown in a high temperature carbon arc (Iijima, Nature 354, 56, 1991). It is now generally accepted (Weaver, Science 265, 1994) that these arc-grown nanofibers have the same morphology as the earlier catalytically grown fibrils of Tennent. Arc grown carbon nanofibers after colloquially referred to as "bucky tubes", are also useful in the invention.

Carbon nanotubes differ physically and chemically from continuous carbon fibers which are commercially available as reinforcement materials, and from other forms of carbon such as standard graphite and carbon black. Standard graphite, because of its structure, can undergo oxidation to almost complete saturation. Moreover, carbon black is amorphous carbon generally in the form of spheroidal particles having a graphene structure, carbon layers around a disordered nucleus. The differences make graphite and carbon black poor predictors of nanotube chemistry.

Aggregates of Carbon Nanotubes and Assemblages

As produced carbon nanotubes may be in the form of discrete nanotubes, aggregates of nanotubes or both.

Nanotubes are prepared as aggregates having various morphologies (as determined by scanning electron microscopy) in which they are randomly entangled with each other to form entangled balls of nanotubes resembling bird nests ("BN"); or as aggregates consisting of bundles of straight to slightly bent or kinked carbon nanotubes having substantially the same relative orientation, and having the appearance of combed yarn ("CY") e.g., the longitudinal axis of each nanotube (despite individual bends or kinks) extends in the same direction as that of the surrounding nanotubes in the bundles; or, as, aggregates consisting of straight to slightly bent or kinked nanotubes which are loosely entangled with each other to form an "open net" ("ON") structure. In open net structures the extent of nanotube entanglement is greater than observed in the combed yarn aggregates (in which the individual nanotubes have substantially the same relative orientation) but less than that of bird nest.

The morphology of the aggregate is controlled by the choice of catalyst support. Spherical supports grow nanotubes in all directions leading to the formation of bird nest aggregates. Combed yarn and open nest aggregates are prepared using supports having one or more readily cleavable planar surfaces, e.g., an iron or iron-containing metal catalyst particle deposited on a support material having one or more readily cleavable surfaces and a surface area of at least 1 square meters per gram. Moy et al., U.S. application Ser. No. 08/469,430 entitled "Improved Methods and Catalysts for the Manufacture of Carbon Fibrils", filed Jun. 6, 1995, hereby incorporated by reference, describes nanotubes prepared as aggregates having various morphologies (as determined by scanning electron microscopy).

Further details regarding the formation of carbon nanotube or nanofiber aggregates may be found in the disclosure of U.S. Pat. No. 5,165,909 to Tennent; U.S. Pat. No. 5,456,897 to Moy et al.; Snyder et al., U.S. patent application Ser. No. 07/149,573, filed Jan. 28, 1988, and PCT Application No. US89/00322, filed Jan. 28, 1989 ("Carbon Fibrils") WO 89/07163, and Moy et al., U.S. patent application Ser. No. 413,837 filed Sep. 28, 1989 and PCT Application No. US90/05498, filed Sep. 27, 1990 ("Battery") WO 91/05089, and U.S. application Ser. No. 08/479,864 to Mandeville et al., filed Jun. 7, 1995 and U.S. application Ser. No. 08/284,917, filed Aug. 2, 1994 and U.S. application Ser. No. 08/320,564, filed Oct. 11, 1994 by Moy et al., all of which are assigned to the same assignee as the invention here and are hereby incorporated by reference.

Nanotube mats or assemblages have been prepared by dispersing nanofibers in aqueous or organic mediums and then filtering the nanofibers to form a mat or assemblage. The mats have also been prepared by forming a gel or paste of nanotubes in a fluid, e.g. an organic solvent such as propane and then heating the gel or paste to a temperature above the critical temperature of the medium, removing the supercritical fluid and finally removing the resultant porous mat or plug from the vessel in which the process has been carried out. See, U.S. patent application Ser. No. 08/428,496 entitled "Three-Dimensional Macroscopic Assemblages of Randomly Oriented Carbon Fibrils and Composites Containing Same" by Tennent et al., which has issued as U.S. Pat. No. 5,691,054 on Nov. 25, 1997, hereby incorporated by reference.

Oxidation of Fibrils

McCarthy et al., U.S. patent application Ser. No. 08/329,774 filed Oct. 27, 1994, hereby incorporated by reference, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups.

Fibrils have also been oxidized non-uniformly by treatment with nitric acid. International Application PCT/US94/10168 filed on Sep. 9, 1994 as WO95/07316 discloses the formation of oxidized fibrils containing a mixture of functional groups. Hoogenvaad, M. S., et al. ("Metal Catalysts supported on a Novel Carbon Support", Presented at Sixth International Conference on Scientific Basis for the Preparation of Heterogeneous Catalysts, Brussels, Belgium, September 1994) also found it beneficial in the preparation of fibril-supported precious metals to first oxidize the fibril surface with nitric acid. Such pretreatment with acid is a standard step in the preparation of carbon-supported noble metal catalysts, where, given the usual sources of such carbon, it serves as much to clean the surface of undesirable materials as to functionalize it.

In published work, McCarthy and Bening (Polymer Preprints ACS Div. of Polymer Chem. 30 (1)420(1990)) prepared derivatives of oxidized fibrils in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal. These compounds were not isolated and are, unlike the derivatives described herein, of no practical significance.

Fisher et al., U.S. Ser. No. 08/352,400 filed Dec. 8, 1994, Fisher et al., U.S. Ser. No. 08/812,856 filed Mar. 6, 1997, Tennent et al., U.S. Ser. No. 08/856,657 filed May 15, 1997, Tennent, et al., U.S. Ser. No. 08/854,918 filed May 13, 1997 and Tennent et al., U.S. Ser. No. 08/857,383 filed May 15, 1997 all hereby incorporated by reference describe processes for oxidizing the surface of carbon fibrils that include contacting the fibrils with a strong oxidizing agent such as a solution of alkali metal chlorate in a strong acid such as sulfuric acid.

Additionally, these applications also describe methods of uniformly functionalizing carbon fibrils by sulfonation, electrophilic addition to deoxygenated fibril surfaces or metallation. Sulfonation of the fibrils can be accomplished with sulfuric acid or $SO_3$ in vapor phase which gives rise to carbon fibrils bearing appreciable amounts of sulfones so much so that the sulfone functionalized fibrils show a significant weight gain.

U.S. Pat. No. 5,346,683 to Green, et al. describes uncapped and thinned carbon nanotubes produced by reaction with a flowing reactant gas capable of reacting selectively with carbon atoms in the capped end region of arc grown nanotubes.

U.S. Pat. No. 5,641,466 to Ebbesen et al. describes a procedure for purifying a mixture of arc grown arbon nanotubes and impurity carbon materials such as carbon nanoparticles and possibly amorphous carbon by heating the mixture in the presence of an oxidizing agent at a temperature in the range of 600° C. to 1000° C. until the impurity carbon materials are oxidized and dissipated into gas phase.

In a published article Ajayan and Iijima (Nature 361, p. 334-337 (1993)) discuss annealing of carbon nanotubes by heating them with oxygen in the presence of lead which results in opening of the capped tube ends and subsequent filling of the tubes with molten material through capillary action.

In other published work, Haddon and his associates ((Science, 282, 95 (1998) and J. Mater. Res., Vol. 13, No. 9, 2423 (1998)) describe treating single-walled carbon nanotube materials (SWNTM) with dichlorocarbene and Birch reduction conditions in order to incorporate chemical functionalities into SWNTM. Derivatization of SWNT with thionyl chloride and octadecylamine rendered the SWNT soluble in common organic solvents such as chloroform, dichlororomethane, aromatic solvents and $CS_2$.

Functionalized Nanotubes

Functionalized nanotubes have been generally discussed in U.S. Ser. No. 08/352,400 filed on Dec. 8, 1994 and in U.S. Ser. No. 08/856,657 filed May 15, 1997, both incorporated herein by reference. In these applications the nanotube surfaces are first oxidized by reaction with strong oxidizing or other environmentally unfriendly chemical agents. The nanotube surfaces may be further modified by reaction with other functional groups. The nanotube surfaces have been modified with a spectrum of functional groups so that the nanotubes could be chemically reacted or physically bonded to chemical groups in a variety of substrates.

Complex structures of nanotubes have been obtained by linking functional groups on the tubes with one another by a range of linker chemistries.

Representative functionalized nanotubes broadly have the formula

where n is an integer, L is a number less than 0.1 n, m is a number less than 0.5n, each of R is the same and is selected from $SO_3H$, COOH, $NH_2$, OH, O, CHO, CN, COCl, halide, COSH, SH, R', COOR', SR', $SiR'_3$, $Si\text{-}(OR')_y R'_{3-y}$, $Si\text{-}(O\text{-}SiR'_2\text{-})OR'$, R'', Li, $AlR'_2$, Hg—X, $TlZ_2$ and Mg—X, y is an integer equal to or less than 3, R' is alkyl, aryl, heteroaryl, cycloalkyl aralkyl or heteroaralkyl, R'' is fluoroalkyl, fluoroaryl, fluorocycloalkyl, fluoroaralkyl or cycloaryl, X is halide, and Z is carboxylate or trifluoroacetate.

The carbon atoms, $C_n$, are surface carbons of the nanofiber.

There are many drawbacks associated with the methods now available to provide oxidized carbon nanotubes. For example, one disadvantage of using strong acid treatment is the generation of environmentally harmful wastes. Treating such wastes increases the production costs of the products in which oxidized nanotubes can be used, such as electrodes and capacitors.

It would, therefore, be desirable to provide methods of oxidizing carbon nanotubes which do not use or generate environmentally hazardous chemicals, and which can be scaled up easily and inexpensively.

While many uses have been found for carbon nanotubes and aggregates of carbon nanotubes, as described in the patents and patent applications referred to above, many different and important uses may still be developed if the nanotubes surfaces are oxidized. Oxidation permits interaction of the oxidized nanotubes with various substrates to form unique compositions of matter with unique properties and permits structures of carbon nanotubes to be created based on linkages between the functional sites on the surfaces of the carbon nanotubes.

OBJECTS OF THE INVENTION

It is, therefore, a primary object of this invention to provide methods of oxidizing multiwalled carbon nanotubes having a diameter no greater than 1 micron.

It is a further and related object to provide methods of oxidizing multiwalled carbon nanotubes by utilizing environmentally benign oxidizing agents such as $CO_2$, $O_2$, steam, $H_2O$, No, $NO_2$, $O_3$ and $ClO_2$.

It is a further object to provide methods of producing a network of multiwalled carbon nanotubes oxidized by the methods of the invention.

It is still a further object to provide methods for preparing rigid porous structures from oxidized multiwalled nanotubes.

It is still a further object to provide an electrochemical capacitor having at least one electrode prepared from multiwalled carbon nanotubes oxidized according to methods of the invention.

SUMMARY OF THE INVENTION

The present invention, which addresses the needs of the prior art provides methods of oxidizing multiwalled carbon nanotubes having a diameter no greater than 1 micron.

More specifically, it has now been found that multiwalled nanotubes can be oxidized by contacting them with a gas-phase oxidizing agent at defined temperatures and pressures. The gas-phase oxidizing agents of the invention include $CO_2$, $O_2$, steam, $N_2O$, NO, $NO_2$, $O_3$, $ClO_2$ and mixtures thereof. Near critical and supercritical water can also be used as oxidizing agents. The oxidized multiwalled carbon nanotubes prepared according to methods of the invention include carbon and oxygen containing moieties, such as carbonyl, carboxyl, aldehyde, ketone, hydroxy, phenolic, esters, lactones and derivatives thereof.

The multiwalled carbon nanotubes oxidized according to methods of the present invention can be subjected to a secondary treatment step whereby the oxygen containing moieties of the oxidized nanotubes react with suitable reactants to add at least a secondary group onto the surface of the oxidized nanotubes.

As a result of the present invention multiwalled carbon nanotubes oxidized according to methods of the invention are provided which are also useful in preparing a network of carbon nanotubes, a rigid porous structure or as starting material for electrodes utilized in electrochemical capacitors.

Electrochemical capacitors assembled from electrodes made from the oxidized multiwalled carbon nanotubes of the invention exhibit enhanced electrochemical characteristics, such as specific capacitance.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

BRIEF DESCRIPTION OF THE DRAWINGS

FIG. 2 is an SEM micrograph illustrating aggregates of multiwalled carbon nanotubes oxidized according to the invention at ×3000 magnification.

FIG. 3 is an SEM micrograph illustrating aggregates of multiwalled carbon nanotubes oxidized according to the invention at ×50,000 magnification.

FIG. 4 is an SEM micrograph illustrating aggregates of multiwalled carbon nanotubes oxidized according to the invention at ×10,000 magnification.

FIG. 5 is an SEM micrograph illustrating the tip portion of an aggregate of multiwalled carbon nanotubes oxidized according to the invention at ×50,000 magnification.

DETAILED DESCRIPTION OF THE INVENTION

Definitions

Figure 1:
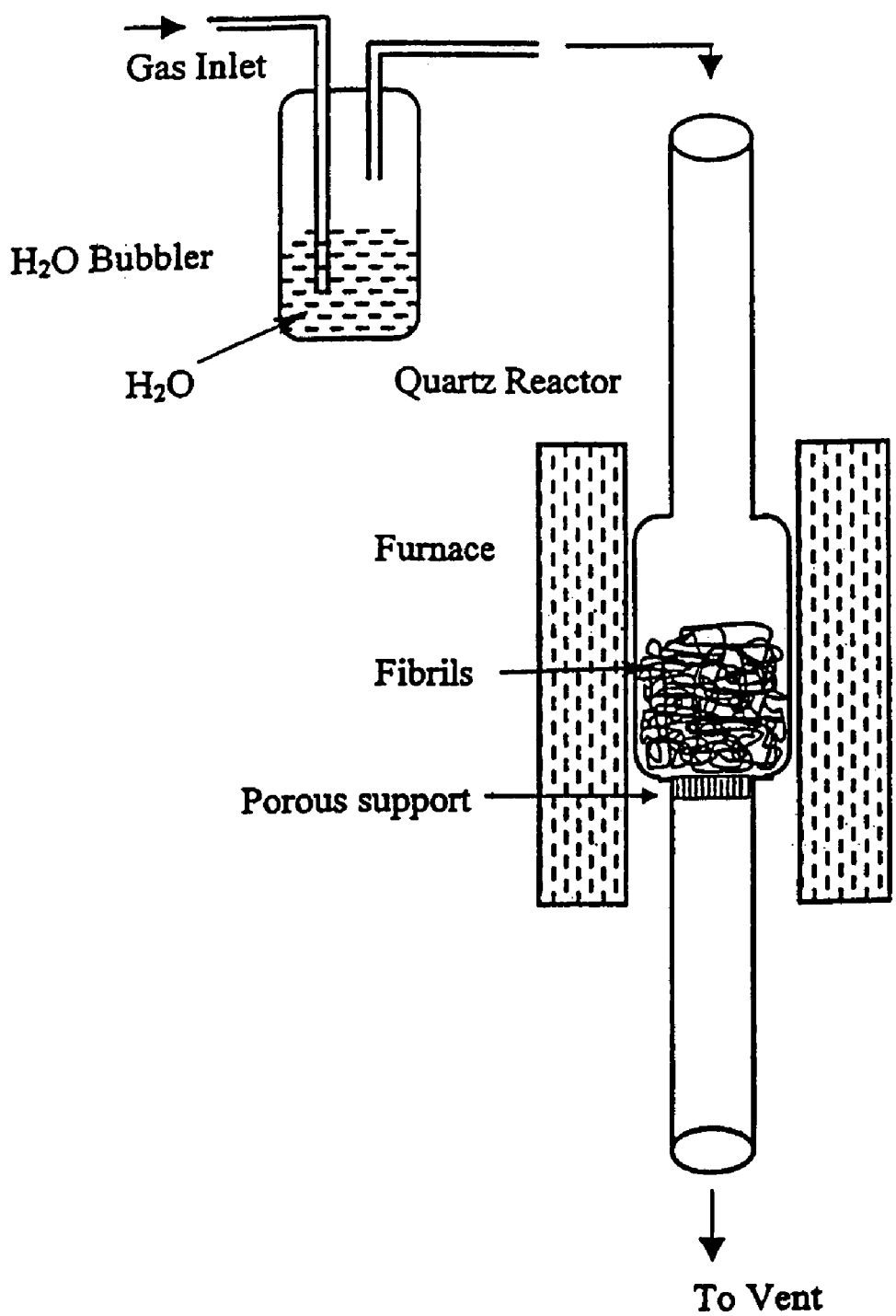
FIG. 1 is a schematic illustration of a quartz reactor used to carry out gas phase oxidation.

The terms "nanotube", "nanofiber" and "fibril" are used interchangeably. Each refers to an elongated hollow structure having a cross section (e.g. angular fibers having edges) or a diameter (e.g. rounded) less than 1 micron. The term "nanotube also includes "buckytubes", and fishbone fibrils.

"Multiwalled nanotubes" as used herein refers to carbon nanotubes which are substantially cylindrical, graphitic nanotubes of substantially constant diameter and comprise cylindrical graphitic sheets or layers whose c-axes are substantially perpendicular to their cylindrical axis, as also described in U.S. Pat. No. 5,171,560 to Tennent, et al.

The term "functional group" refers to groups of atoms that give the compound or substance to which they are linked characteristic chemical and physical properties.

A "functionalized" surface refers to a carbon surface on which chemical groups are adsorbed or chemically attached.

"Graphenic" carbon is a form of carbon whose carbon atoms are each linked to three other carbon atoms in an essentially planar layer forming hexagonal fused rings. The layers are platelets only a few rings in diameter or they may be ribbons, many rings long but only a few rings wide.

"Graphenic analogue" refers to a structure which is incorporated in a graphenic surface.

"Graphitic" carbon consists of grapheric layers which are essentially parallel to one another and no more than 3.6 angstroms apart.

The term "aggregate" refers to a dense, microscopic particulate structure comprising entangled carbon nanotubes.

The term "micropore" refers to a pore which has a diameter of less than 2 nanometers.

The term "mesopore" refers to pores having a cross section greater than 2 nanometers and less than 50 nanometers.

The term "surface area" refers to the total surface area of a substance measurable by the BET technique.

The term "accessible surface area" refers to that surface area not attributed to micropores (i.e., pores having diameters or cross-sections less than 2 nm).

The term "isotropic" means that all measurements of a physical property within a plane or volume of the structure, independent of the direction of the measurement, are of a constant value. It is understood that measurements of such non-solid compositions must be taken on a representative sample of the structure so that the average value of the void spaces is taken into account.

The term "physical property" means an inherent, measurable property, e.g., surface area, resistivity, fluid flow characteristics, density, porosity, and the like.

The term "relatively" means that ninety-five percent of the values of the physical property when measured along an axis of, or within a plane of or within a volume of the structure, as the case may be, will be within plus or minus 20 percent of a mean value.

The term "substantially" means that ninety-five percent of the values of the physical property when measured along an axis of, or within a plane of or within a volume of the structure, as the case may be, will be within plus or minus ten percent of a mean value.

The terms "substantially isotropic" or "relatively isotropic" correspond to the ranges of variability in the values of physical properties set forth above.

The term "predominantly" has the same meaning as the term "substantially".

Methods of Oxidizing Carbon Nanotubes and Aggregates of Carbon Nanotubes

The present invention provides methods of oxidizing the surface of carbon nanotubes. The resulting oxidized nanotubes can be easily dispersed in both organic and inorganic solvents, and especially in water. The surface-oxidized nanotubes obtained by the methods of the present invention can be placed in matrices of other materials, such as plastics, or made into structures useful in catalysis, chromatography, filtration systems, electrodes, capacitors and the like.

The carbon nanotubes useful for the methods of the present invention have been more specifically described above under the heading "Carbon Nanotubes," and they are preferably prepared according to U.S. application Ser. No. 08/459,534 filed Jun. 2, 1995 assigned to Hyperion Catalysis International, Inc. of Cambridge, Mass., incorporated herein by reference.

The carbon nanotubes preferably have diameters no greater than one micron, more preferably no greater than 0.2 micron. Even more preferred are carbon nanotubes having diameters between 2 and 100 nanometers, inclusive. Most preferred are carbon nanotubes having diameters between 3.5 and 75 nanometers, inclusive.

The nanotubes are substantially cylindrical, graphitic carbon fibrils of substantially constant diameter and are substantially free of pyrolytically deposited carbon. The nanotubes include those having a length to diameter ratio of greater than 5 with the projection of the graphite layers on the nanotubes extending for a distance of at least two nanotube diameters. Most preferred are multiwalled nanotubes as described in U.S. Pat. No. 5,171,560 to Tennent, et al, incorporated herein by reference.

The methods of the invention include contacting the carbon nanotubes with a gas-phase oxidizing agent under conditions sufficient to oxidize the surface of the carbon nanotubes, and especially the external side walls of the carbon nanotubes.

Compounds useful as gas-phase oxidizing agents are commercially readily available and include carbon dioxide, oxygen, steam, $N_2O$, $NO$, $NO_2$, ozone, $ClO_2$ and mixtures thereof. In a preferred embodiment the gas-phase oxidizing agents can be diluted with inert gases such as nitrogen, noble gases and mixtures thereof. The dilution reduces the partial pressure of the oxidant to the range of 1 to 760 torr.

Suitable conditions for oxidizing the carbon nanotubes of the invention include a temperature range from about 200° C. to about 600° C. whenever the oxidizing agent is oxygen, ozone, $N_2O$, $NO$, $NO_2$, $ClO_2$ or mixtures thereof. The mass molecular weight of the oxidizing agents of the present invention does not exceed 70 g/mole. When the oxidizing agent is carbon dioxide or steam, the treatment of the carbon nanotubes with the gas-phase oxidizing agent is preferably accomplished in a temperature range from about 400° C. to about 900° C. Useful partial pressures of the oxidizing agent for the methods of the present invention include contacting of the carbon nanotubes with the gas-phase oxidizing agents of the invention in a range from about 1 torr to about 10 atm or 7600 torr, preferably 5 torr to 760 torr.

In one aspect of the invention the gas-phase oxidizing agent is near critical or supercritical water. Supercritical water refers to water above its critical temperature of 374° C. At this temperature, retention of a condensed phase requires a pressure in excess of 3200 psia. It is well known that supercritical water exhibits anomalously low viscosity, thus enabling it to penetrate aggregates.

In the vicinity of the critical point, viscosity, and, in fact, most of the thermodynamic and transport properties of a compound, correlate with specific volume. Viscosities useful in practicing the invention can also be achieved in near critical water having a specific volume up to twice its critical specific volume of 0.05 ft 3/lb or up to 0.10 ft 3/lb. While this range of specific volumes can be achieved by various combinations of near critical temperature and pressure, at saturation, this corresponds to a temperature of 363° C. and a pressure of 3800 psia.

A useful period of time for contacting of the carbon nanotubes or aggregates of carbon nanotubes, with the gas-phase oxidizing agents of the invention is from 0.1 hours to about 24 hours, preferably from about 1 hour to about 8 hours, and most preferably for about 2-4 hours.

The present invention provides economical, environmentally benign methods to oxidize the surface of the multiwalled carbon nanotubes. While not wishing to be bound by theory, it is believed that when treating the carbon nanotubes with the oxidizing agents of the invention oxygen-containing moieties are introduced onto the surface side walls of the carbon nanotubes. The oxidized nanotubes include moieties such as carbonyl, carboxyl, aldehyde, phenol, hydroxy, esters, lactones and mixtures thereof. Specifically excluded are moieties in which oxygen is not directly bonded to carbon. For example, the use of $SO_3$ vapor results in the sulfonation of the carbon nanotubes whereby sulfur containing moieties are introduced onto the surface of the nanotubes. Sulfonated nanotubes exhibit a significant weight gain by comparison to non-sulfonated carbon nanotubes.

It has been unexpectedly found that upon treatment with the oxidizing agents of the present invention, the oxidized nanotubes have experienced a weight loss rather than gain. For example, it has been found that the carbon nanotubes experienced a weight loss from about 1% to about 60% by weight and preferably from about 2% to about 15% by weight by comparison to the unoxidized carbon nanotubes.

While it is not intended to be bound by theory, it has been well established that the edge carbon of a graphite sheet is much more susceptible to chemical reaction than the basal plane carbon. The carbon nanotubes useful in the present invention have a tubular structure resembling buckytubes. On the surface along the axis, the carbon atoms have the characteristics of basal plane graphite except for those associated with defect sites. However, the carbon atoms at the end of a nanotube are either edge carbons or carbons associated with high-energy bonds, like members of a five-carbon ring or atoms attached to a catalyst particles. All of these carbons are much more susceptible to chemical attack. Thus, upon treatment with the oxidizing agents of the invention the nanotubes may become shortened and surface carbon layers may be partially stripped.

The oxidized nanotubes produced by the methods of the invention exhibit upon titration an acid titer of from about 0.05 meq/g to about 0.6 meq/g and preferably from about 0.1 meq/g to about 0.4 meq/g. For example, the content of carboxylic acid is determined by reacting an amount of 0.1 N NaOH in excess of the anticipated titer with the sample and then back titrating the resulting slurry with O0.1N HCl to an end point determined potentiometrically at pH7.

Another aspect of the invention relates to treating aggregates of carbon nanotubes with the gas-phase oxidizing agents. The aggregates treated according to the invention display a macromorphology which can be described as "loose bundles" having the appearance of a severely weathered rope. The nanotubes themselves retain a morphology similar to the as-synthesized nanotubes, however, with oxygen-containing moieties attached to the nanotube surfaces. While it is not intended to be bound by theory, it is believed that in the case of aggregates, the chemical bonding between the catalyst plate which defines the size of the bundles and the nanotubes is eliminated. In addition, the nanotubes may exhibit shortening and carbon layers are believed to become partially stripped. An increase in specific surface area has also been observed. For example, untreated aggregates have a specific surface area of about 250 $m^2$/gm, while oxidized aggregates display a specific surface area up to 400 $m^2$/gm. The foregoing changes which take place upon oxidiation with the oxidizing agents of the invention have been observed by scanning electron microscopy (SEM), transmission electron microscopy (TEM) and surface area measurement. SEM photographs shown in FIGS. 2-5 taken after treatment of aggregates with the oxidizing agents of the invention support the structured changes of the nanotubes discussed above. Specifically, FIGS. 3 and 5 show many shortened and separated nanotube ends which can be seen at the ends of and on the surface of the "loose bundles" of oxidized nanotube aggregates. More importantly, FIGS. 3 and 5 also show that the macrostructure or macromorphology and average diameters of the aggregates (combed yarn in FIG. 5) remain almost unchanged by comparison to those of the unoxidized aggregates. Similarly, the oxidized aggregates retain the original loose powder form of the unoxidized aggregates. As a result of the addition of oxygen containing moieties on the surface of oxidized carbon nanotubes and the retention of their macrostructure, the gas-phase oxidized nanotubes obtained by methods of the invention have shown increased dispersion in polar solvents.

Gas phase oxidized nanotubes can also be used in the production of high quality extrudates which can be formed by using a small amount of water soluble binder. In the preparation of extrudates, the oxidized surface of the nanotubes allows for improved binder dispersion during the mixing stage and minimizes the segregation of binder in the subsequent heating step.

Secondary Derivatives of Oxidized Nanotubes

Advantageously, the oxidized nanotubes obtained by the oxidizing methods of the invention can be further treated. In one embodiment of the invention after the oxidized nanotubes are formed, they may be further treated in a secondary treatment step, by contacting with a reactant suitable to react with moieties of the oxidized nanotubes thereby adding at least another secondary functional group. Secondary derivatives of the oxidized nanotubes are essentially limitless. For example, oxidized nanotubes bearing acidic groups like —COOH are convertible by conventional organic reactions to virtually any desired secondary group, thereby providing a wide range of surface hydrophilicity or hydrophobicity.

The secondary group that can be added by reacting with the moieties of the oxidized nanotubes include but are not limited to alkyl/aralkyl groups having from 1 to 18 carbons, a hydroxyl group having from 1 to 18 carbons, an amine group having from 1 to 18 carbons, alkyl aryl silanes having from 1 to 18 carbons and fluorocarbons having from 1 to 18 carbons. Other appropriate secondary groups that can be attached to the moieties present on the oxidized nanotubes include a protein, a peptide, an enzyme, an antibody, a nucleotide peptide, an oligonucleotide, an antigen or an enzyme substrate, enzyme inhibitor or the transition state analog of an enzyme substrate.

Other Structures

The invention is also in methods for producing a network of carbon nanotubes comprising treating carbon nanotubes with a gas phase oxidizing agent of the invention for a period of time sufficient to oxidize the surface of the carbon nanotubes, contacting the oxidized carbon nanotubes with a reactant suitable for adding a secondary functional group to the surface of the carbon nanotube, and further contacting the secondarily treated nanotubes with a cross-linking agent effective for producing a network of carbon nanotubes. A preferred cross-linking agent is a polyol, polyamine or polycarboxylic acid. A useful polyol is a diol and a useful polyamine is a diamine.

In one aspect of the invention a network of carbon nanotubes is obtained by first oxidizing the as-produced carbon nanotubes with the gas-phase oxidizing agents of the invention, followed by subjecting the oxidized nanotubes to conditions which foster crosslinking. For example, heating the oxidized nanotubes in a temperature range from 180° C. to 450° C. resulted in crosslinking the oxidized nanotubes together with elimination of the oxygen containing moieties of the oxidized nanotubes.

The invention also includes three-dimensional networks formed by linking the surface-modified nanotubes of the invention. These complexes include at least two surface-modified nanotubes linked by one or more linkers comprising a direct bond or chemical moiety. These networks comprise porous media of remarkably uniform equivalent pore size. They are useful as adsorbents, catalyst supports and separation media.

Three Dimensional Structures

The oxidized nanotubes of the invention are more easily dispersed in aqueous media than unoxidized nanotubes. Stable, porous 3-dimensional structures with meso- and macropores (pores>2 nm) are very useful as catalysts or chromatography supports. Since nanotubes can be dispersed on an individualized basis, a well-dispersed sample which is stabilized by cross-links allows one to construct such a support. Surface-oxidized nanotubes are ideal for this application since they are easily dispersed in aqueous or polar media and the oxygen-containing moieties present on the oxidized nanotubes provide cross-link points. Additionally, the oxygen-containing moieties also provide points to support the catalytic or chromatographic sites. The end result is a rigid, 3-dimensional structure with its total surface area accessible with secondary group sites on which to support the active agent.

Although the interstices between these nanotubes are irregular in both size and shape, they can be thought of as pores and characterized by the methods used to characterize porous media. The size of the interstices in such networks can be controlled by the concentration and level of dispersion of nanotubes, and the concentration and chain lengths of the cross-linking agents. Such materials can act as structured catalyst supports and may be tailored to exclude or include molecules of a certain size. Aside from conventional industrial catalysis, they have special applications as large pore supports for biocatalysts.

Typical applications for these supports in catalysis include their use as a highly porous support for metal catalysts laid down by impregnation, e.g., precious metal hydrogenation catalysts. Moreover, the ability to anchor molecular catalysts by tether to the support via the secondary groups combined with the very high porosity of the structure allows one to carry out homogeneous reactions in a heterogeneous manner. The tethered molecular catalyst is essentially dangling in a continuous liquid phase, similar to a homogeneous reactor, in which it can make use of the advantages in selectivities and rates that go along with homogeneous reactions. However, being tethered to the solid support allows easy separation and recovery of the active, and in many cases, very expensive catalyst.

These stable, rigid structures also permits carrying out heretofore very difficult reactions, such as asymmetric syntheses or affinity chromatography by attaching a suitable enantiomeric catalyst or selective substrate to the support. The rigid networks can also serve as the backbone in biomimetic systems for molecular recognition. Such systems have been described in U.S. Pat. No. 5,110,833 and International Patent Publication No. WO93/19844. The appropriate choices for cross-linkers and complexing agents allow for stabilization of specific molecular frameworks.

Methods of Preparing Rigid Porous Structures

In one aspect of the invention rigid porous structures are prepared by first preparing surface-oxidized nanotubes as described above, dispersing them in a medium to form a suspension, separating the medium from the suspension to form a porous structure, wherein the surface-oxidized nanotubes are further interconnected to form a rigid porous structure, all in accordance with methods more particularly described in U.S. application Ser. No. 08/857,383 (WBAM Docket No. 0064734-0080) entitled "Rigid Porous Carbon Structures, Methods of Making, Methods of Using and Products Containing Same" filed on May 15, 1997, hereby incorporated by reference.

The hard, high porosity structures can be formed from regular carbon nanotubes or nanotube aggregates, either with or without surface modified nanofibers (i.e., surface oxidized nanofibers). In order to increase the stability of the nanotube structures, it is also possible to deposit polymer at the intersections of the structure. This may be achieved by infiltrating the assemblage with a dilute solution of low molecular weight polymer cement (i.e., less than about 1,000 MW) and allowing the solvent to evaporate. Capillary forces will concentrate the polymer at nanotube intersections. It is understood that in order to substantially improve the stiffness and integrity of the structure, only a small fraction of the nanotube intersections need be cemented.

One embodiment of the invention relates to a method of preparing a rigid porous carbon structure having a surface area greater than at least 100 m$^2$/gm, comprising the steps of:
(a) dispersing a plurality of nanofibers in a medium to form a suspension; and
(b) separating said medium from said suspension to form said structure,
wherein said nanotubes are interconnected to form said rigid structure of intertwined nanotubes bonded at nanotube intersections within the structure.

The nanotubes may be uniformly and evenly distributed throughout the structure or in the form of aggregate particles interconnected to form the structure. When the former is desired, the nanotubes are dispersed thoroughly in the medium to form a dispersion of individual nanotubes. When the latter is desired, nanotube aggregates are dispersed in the medium to form a slurry and said aggregate particles are connected together with a gluing agent to form said structure.

The medium used may be selected from the group consisting of water and organic solvents. Preferably, the medium comprises a dispersant selected from the group consisting of alcohols, glycerin, surfactants, polyethylene glycol, polyethylene imines and polypropylene glycol.

The medium should be selected which: (1) allows for fine dispersion of the gluing agent in the aggregates; and (2) also acts as a templating agent to keep the internal structure of the aggregates from collapsing as the mix dries down.

One preferred embodiment employs a combination of polyethylene glycol (PEG) and glycerol dissolved in water or alcohol as the dispersing medium, and a carbonizable material such as low MW phenol-formaldehyde resins or other carbonizable polymers or carbohydrates (starch or sugar). Once the rigid porous structure has been prepared, it can then be oxidized with the oxidizing agents of the invention in preparation for use in electrochemical capacitors, for example. The oxidation occurs in the same pressure and temperature ranges as are used to oxidize nanotubes, aggregates or assemblages of carbon nanotubes.

In another embodiment, if surface oxidized nanotubes are employed, the nanotubes are oxidized prior to dispersing in the medium and are self-adhering forming the rigid structure by binding at the nanotube intersections. The structure may be subsequently pyrolyzed to remove oxygen. A useful temperature range is from about 200° C. to about 2000° C. and preferably from about 200° C. to about 900° C.

According to another embodiment, the nanotubes are dispersed in said suspension with gluing agents and the gluing agents bond said nanotubes to form said rigid structure. Preferably, the gluing agent comprises carbon, even more preferably the gluing agent is selected from a material that, when pyrolized, leaves only carbon. Accordingly, the structure formed with such a gluing may be subsequently pyrolized to convert the gluing agent to carbon.

Preferably, the gluing agents are selected from the group consisting of cellulose, carbohydrates, polyethylene, polystyrene, nylon, polyurethane, polyester, polyamides and phenolic resins.

According to further embodiments of the invention, the step of separating comprises filtering the suspension or evaporating the medium from said suspension.

According to yet another embodiment, the suspension is a gel or paste comprising the nanotubes in a fluid and the separating comprises the steps of:
(a) heating the gel or paste in a pressure vessel to a temperature above the critical temperature of the fluid;
(b) removing supercritical fluid from the pressure vessel; and
(c) removing the structure from the pressure vessel.

Isotropic slurry dispersions of nanotube aggregates in solvent/dispersant mixtures containing gluing agent can be accomplished using a Waring blender or a kneader without disrupting the aggregates. The nanotube aggregates trap the resin particles and keep them distributed.

These mixtures can be used as is, or can be filtered to remove sufficient solvent to obtain cakes with high nanotube contents (5-20% dry weight basis). The cake can be molded, extruded or pelletized. The molded shapes are sufficiently stable so that further drying occurs without collapse of the form. On removing solvent, disperant molecules, along with particles of gluing agent are concentrated and will collect at nanotube crossing points both within the nanotube aggregates, and at the outer edges of the aggregates. As the mixture is further dried down and eventually carbonized, nanotube strands within the aggregates and the aggregates themselves are glued together at contact points. Since the aggregate structures do not collapse, a relatively hard, very porous, low density particle is formed.

As set forth above, the rigid, porous structures may also be formed using oxidized nanotubes with or without a gluing agent. Carbon nanotubes become self-adhering after oxidation. Very hard, dense mats are formed by highly dispersing the oxidized nanotubes (as individualized strands), filtering and drying. The dried mats have densities between 1-1.2 g/cc, depending on oxygen content, and are hard enough to be ground and sized by sieving. Measured surface areas are about 275 $m^2/g$.

Substantially all the oxygen within the resulting rigid structure can be removed by pyrolyzing the particles at about 600° C. in flowing gas, for example argon. Densities decrease to about 0.7-0.9 g/cc and the surface areas increase to about 400 $m^2/g$. Pore volumes for the calcined particles are about 0.9-0.6 cc/g, measured by water absorbtion.

The oxidized nanotubes may also be used in conjunction with a gluing agent. Oxidized nanotubes are good starting materials since they have attachment points to stick both gluing agents and templating agents. The latter serve to retain the internal structure of the particles or mats as they dry, thus preserving the high porosity and low density of the original nanotube aggregates. Good dispersions are obtained by slurrying oxidized nanotubes with materials such as polyethyleneimine cellulose (PEI Cell), where the basic imine functions form strong electrostatic interactions with carboxylic acid functionalized fibrils. The mix is filtered to form mats. Pyrolyzing the mats at temperatures greater than 650° C. in an inert atmosphere converts the PEI Cell to carbon which acts to fuse the nanotube aggregates together into hard structures. The result is a rigid, substantially pure carbon structure, which can then be oxidized with the oxidizing agents of the present invention.

Solid ingredients can also be incorporated within the structure by mixing the additives with the nanotube dispersion prior to formation of the structure. The content of other solids in the dry structure may be made as high as fifty parts solids per part of nanotubes.

According to one preferred embodiment, nanotubes are dispersed at high shear in a high-shear mixer, e.g. a Waring Blender. The dispersion may contain broadly from 0.01 to 10% nanotubes in water, ethanol, mineral spirits, etc. This procedure adequately opens nanotube bundles, i.e. tightly wound bundles of nanotubes, and disperses the nanotubes to form self-supporting mats after filtration and drying. The application of high shear mixing may take up to several hours. Mats prepared by this method, however, are not free of aggregates.

If the high shear procedure is followed by ultrasonication, dispersion is improved. Dilution to 0.1% or less aids ultrasonication. Thus, 200 cc of 0.1% fibrils, for example, may be sonified by a Bronson Sonifier Probe (450 watt power supply) for 5 minutes or more to further improve the dispersion.

To achieve the highest degrees of dispersion, i.e. a dispersion which is free or virtually free of nanotube aggregates, sonication must take place either at very low concentration in a compatible liquid, e.g. at 0.001% to 0.01% concentration in ethanol or at higher concentration e.g. 0.1% in water to which a surfactant, e.g. Triton X-100, has been added in a concentration of about 0.5%. The mat which is subsequently formed may be rinsed free or substantially free of surfactant by sequential additions of water followed by vacuum filtration. The mat thus formed can then be oxidized with the oxidizing agents of the invention under conditions sufficient to form oxidized nanotubes within the mat.

Particulate solids such as $MnO_2$ (for batteries) and $Al_2O_3$ (for high temperature gaskets) may be added to the oxidized nanotube dispersion prior to mat formation at up to 50 parts added solids per part of nanotubes.

Reinforcing webs and scrims may be incorporated on or in the mats during formation. Examples are polypropylene mesh and expanded nickel screen.

Electrochemical Capacitors

Carbon nanotubes are electrically conductive. Electrodes and their use in electrochemical capacitors comprising carbon nanotubes and/or functionalized carbon nanotubes which have been described in U.S. application Ser. No. 08/856,657 (WBAM Docket No. 0064736-0000) entitled "Graphitic Nanofibers in Electrochemical Capacitors," filed on May 15, 1997 incorporated herein by reference.

Further details about electrochemical capacitors based on catalytically grown carbon nanotubes are disclosed in Chumming Niu et al., "High Power Electrochemical Capacitors based on Carbon Nanotube Electrodes," in *Applied Physics Letters* 70(11), pp. 1480-1482, Mar. 17, 1997 incorporated herein by reference.

The quality of sheet electrode depends on the microstructure of the electrode, the density of the electrode, the functionality of the electrode surface and mechanical integrity of the electrode structure.

The microstructures of the electrode, namely, pore size and size distribution determines the ionic resistance of electrolyte in the electrode. The surface area residing in micropores (pore diameter <2 nm) is considered inaccessible for the formation of a double layer (2). On the other hand, distributed pore sizes, multiple-pore geometries (dead end pores, slit pores, cylindrical pores, etc.) and surface properties usually give rise to a distributed time constant. The energy stored in an electrode with a distributed time constant can be accessed only with different rates. The rapid discharge needed for pulsed power is not feasible with such an electrode.

The density of the electrode determines its volumetric capacitance. An electrode with density less than 0.4 g/cc is not practical for real devices. Simply, the low-density electrode will take up too much electrolyte, which will decrease both volumetric and gravimetric capacitance of the device.

The surface of the carbon nanotubes is related to the wetting properties of electrodes towards electrolytes. The surface of as-produced, catalytically grown carbon nanotubes is hydrophobic. It has been unexpectedly found that the hydrophobic surface properties of the as-produced carbon nanotubes can be changed to hydrophilic by treatment of the as-produced carbon nanotubes or aggregates of carbon nanotubes with the oxidizing agents of the present invention. It has also been unexpectedly found that the dispersing properties in water of surface-oxidized carbon nanotubes are related to weight loss during treatment with such gas-phase oxidizing agents as $CO_2$, $O_2$, steam, $H_2O$, $NO_2$, $O_3$, $ClO_2$ and mixtures thereof. For example, oxidized nanotubes exhibiting a weight loss of about 10% by weight can be easily dispersed in water. It is necessary to oxidize on the surface of the carbon nanotubes to improve their wetting properties for aqueous electrolytes. Furthermore, the capacitance can be increased by further attaching redox groups on the surface of the carbon nanotubes.

Finally, the structural integrity of the electrodes is critical to reproducibility and long term stability of the device. Mechanical strength of electrodes incorporating carbon nanotubes is determined by the degree of entanglement of the carbon nanotube and bonding between carbon nanotubes in the electrode. A high degree of entanglement and carbon nanotube bonding can also improve the conductivity, which is critical to the power performance of an electrode. The specific capacitance (D.C. capacitance) of the electrodes made from gas-phase treated fibrils was about 40 F/g.

One aspect of the present invention relates to preparing electrodes and electrochemical capacitors from surface-oxidized carbon nanotubes. Broadly, as prepared carbon nanotubes have been treated with gas-phase oxidizing agents of the invention to provide surface oxidized, multiwalled carbon nanotubes which can be used to prepare the electrodes of the invention.

In another aspect of the invention, the oxidized nanotubes can be further treated with a reactant suitable to react with moieties present on the oxidized nanotubes to form nanotubes having secondary groups on its surface which are also useful in preparing the electrodes of the present invention.

Electrodes are assembled by simple filtration of slurries of the treated nanotubes. Thickness is controlled by the quantity of material used and the geometry, assuming the density has been anticipated based on experience. It may be necessary to adjust thickness to get self-supporting felts.

The electrodes are advantageously characterized by cyclic voltammetry, conductivity and DC capacitance measurement.

EXAMPLES

The following examples serve to provide further appreciation of the invention but are not meant in any way to restrict the effective scope of the invention.

Example 1

Oxidation of Carbon Nanotubes With Gas Phase $CO_2$

Oxidized carbon nanotubes were prepared by using $CO_2$ in the gaseous phase. About 10 grams of carbon nanotubes were placed into a reactor as shown in FIG. 1. The reactor was a heated quartz tube having a reacting chamber connected at each end to a side tube. The reacting chamber had an outside diameter of about 3 inches and each side tube has an outside diameter of about 1 inch. Between the side tube at the bottom side and the reacting chamber there was a gas permeable porous quartz plate, which supports a bed of carbon nanotubes prepared as described in U.S. application Ser. No. 08/459,534 filed on Jun. 2, 1995.

A stream of gaseous $CO_2$ was continuously passed down through the bed of carbon nanotubes at a rate of about 120 cc/min for 2 hours at about 800° C.

The degree of oxidation was measured by the weight loss exhibited by the carbon nanotubes; a weight loss of about 10% was recorded. The carbon nanotubes oxidized in this manner dispersed in water quite easily whereas they hardly did so prior to treatment with gaseous $CO_2$.

Example 2

Oxidation of Carbon Nanotubes With Wet-Air

Carbon nanotubes were oxidized by using wet air. About 10 grams of carbon nanotubes prepared according to U.S. application Ser. No. 08/459,534 filed on Jun. 2, 1995 were charged into the reactor described in Example 1.

Air saturated with water vapor at room temperature was continuously passed down through the bed of carbon nanotubes at a rate of about 120 cc/min. The temperature of the reactor, measured by a k-type thermocouple positioned inside the bed of carbon nanotubes, was set at 530° C. The degree of oxidation was controlled by variation of the reaction duration and monitored by weight loss, compared to the initial weighted unoxidized carbon nanotubes. Three samples with weight losses of 7.1, 12.4, and 68% corresponding to 4, 5, and 8 hr oxidation, respectively, were prepared.

Example 3

Oxidation of Carbon Nanotubes With Oxygen

Carbon nanotubes are oxidized by using oxygen in the gas phase. About 10 grams of carbon nanotubes prepared according to U.S. Ser. No. 08/459,534 filed on Jun. 2, 1995 are charged into a reactor as described in Example 1.

A stream of gaseous oxygen is continuously passed down through the bed of carbon nanotubes at a rate of about 120 cc/min for 2 hours at 600° C. The temperature of the reactor is measured by a k-type thermocouple positioned inside the bed of carbon nanotubes. The degree of oxidation is controlled by variation of the reaction duration and monitored by weight loss as compared to the initial weight of unoxidized carbon nanotubes. The resulting weight loss is about 10%. The carbon nanotubes oxidized in this manner disperse in water quite easily whereas they hardly do so prior to treatment with gaseous oxygen.

Example 4

Oxidation of Carbon Nanotubes With $N_2O$

Carbon nanotubes are oxidized by using $N_2O$ in the gas phase. About 10 grams of carbon nanotubes prepared according to U.S. Ser. No. 08/459,534 filed on Jun. 2, 1995 are charged into a reactor as described in Example 1.

A stream of gaseous $N_2O$ is continuously passed down through the bed of carbon nanotubes at a rate of about 120 cc/min for 2 hours at 600° C. The temperature of the reactor is measured by a k-type thermocouple positioned inside the bed of carbon nanotubes. The degree of oxidation is controlled by variation of the reaction duration and monitored by weight loss as compared to the initial weight of unoxidized carbon nanotubes. The resulting weight loss is about 10%. The carbon nanotubes oxidized in this manner disperse in water quite easily whereas they hardly do so prior to treatment with gaseous $N_2O$.

Example 5

Oxidation of Carbon Nanotubes With NO

Carbon nanotubes are oxidized by using NO in the gas phase. About 10 grams of carbon nanotubes prepared according to U.S. Ser. No. 08/459,534 filed on Jun. 2, 1995 are charged into a reactor as described in Example 1.

A stream of gaseous NO is continuously passed down through the bed of carbon nanotubes at a rate of about 120 cc/min for 2 hours at 600° C. The temperature of the reactor is measured by a k-type thermocouple positioned inside the bed of carbon nanotubes. The degree of oxidation is controlled by variation of the reaction duration and monitored by weight loss as compared to the initial weight of unoxidized carbon nanotubes. The resulting weight loss is about 10%. The carbon nanotubes oxidized in this manner disperse in water quite easily whereas they hardly do so prior to treatment with gaseous NO.

Example 6

Oxidation of Carbon Nanotubes With $NO_2$

Carbon nanotubes are oxidized by using $NO_2$ in the gas phase. About 10 grams of carbon nanotubes prepared according to U.S. Ser. No. 08/459,534 filed on Jun. 2, 1995 are charged into a reactor as described in Example 1.

A stream of gaseous oxygen is continuously passed down through the bed of carbon nanotubes at a rate of about 120 cc/min for 2 hours at 600° C. The temperature of the reactor is measured by a k-type thermocouple positioned inside the bed of carbon nanotubes. The degree of oxidation is controlled by variation of the reaction duration and monitored by weight loss as compared to the initial weight of unoxidized carbon nanotubes. The resulting weight loss is about 10%. The carbon nanotubes oxidized in this manner disperse in water quite easily whereas they hardly do so prior to treatment with gaseous $NO_2$.

Example 7

Oxidation of Carbon Nanotubes With Ozone

Carbon nanotubes are oxidized by using ozone in the gas phase. About 10 grams of carbon nanotubes prepared according to U.S. Ser. No. 08/459,534 filed on Jun. 2, 1995 are charged into a reactor as described in Example 1.

A stream of gaseous ozone is continuously passed down through the bed of carbon nanotubes at a rate of about 120 cc/min for 2 hours at 600° C. The temperature of the reactor is measured by a k-type thermocouple positioned inside the bed of carbon nanotubes. The degree of oxidation is controlled by variation of the reaction duration and monitored by weight loss as compared to the initial weight of unoxidized carbon nanotubes. The resulting weight loss is about 10%. The carbon nanotubes oxidized in this manner disperse in water quite easily whereas they hardly do so prior to treatment with gaseous ozone.

Example 8

Oxidation of Carbon Nanotubes With $ClO_2$

Carbon nanotubes are oxidized by using $ClO_2$ in the gas phase. About 10 grams of carbon nanotubes prepared according to U.S. Ser. No. 08/459,534 filed on Jun. 2, 1995 are charged into a reactor as described in Example 1.

A stream of gaseous $ClO_2$ is continuously passed down through the bed of carbon nanotubes at a rate of about 120 cc/min for 2 hours at 600° C. The temperature of the reactor is measured by a k-type thermocouple positioned inside the bed of carbon nanotubes. The degree of oxidation is controlled by variation of the reaction duration and monitored by weight loss as compared to the initial weight of unoxidized carbon nanotubes. The resulting weight loss is about 10%. The carbon nanotubes oxidized in this manner disperse in water quite easily whereas they hardly do so prior to treatment with gaseous $ClO_2$.

Example 9

Electrochemical Capacitors Prepared From Carbon Nanotubes Oxidized With $CO_2$ 0.1 g of oxidized nanotubes as prepared in Example 1 were dispersed in deionized water to form a slurry which was then filtered on a 3.5" diameter filter membrane to form a mat with diameter of about 3.3". The mat was dried at 120° C. for approximately one hour and heated at 350° C. in air for 4 hr. The final weight was 0.095 g. The disk electrodes with diameter of 0.5" were made from the mat and soaked overnight in 38% sulfuric acid held at approximately 85° C. and then kept in the acid solution at 25° C. until cell assembly. The electrodes were wetted easily by the electrolyte. Single cell test devices were fabricated with two 38% sulfuric acid saturated electrodes separated by a 0.001" thick polymer separator which was also wetted with 38% sulfuric acid. The equivalent series resistance (E.S.R.) of the test device measured at 1 kHz using a fixed frequency meter was 0.043Ω. The capacitance of the device was measured by a constant current discharging method. The calculated specific capacitance for the electrode was 40 F/g. The frequency response analysis was carried out at d.c. biases of 0V, 0.5V and 1V with a 10 mV amplitude sinusoidal signal using a Solartron model 1250B frequency analyzer driving an EG&G PAR model 273 potensiostat/galvonostat.

Example 10

Electrochemical Capacitors Prepared From Wet-air Oxidized Nanotubes

Nanotubes oxidized as in example 2 were prepared into an electrode according to the process described in example 3. Three single-cell test electrochemical capacitors were fabricated from electrodes made from the nanotubes with weight losses of 7.1, 12.4, and 68%, respectively. Table I summarizes properties of these electrodes and test results of the capacitors made from them. The resistivity of the electrodes was measured using the van der Pauw method, on samples with dimensions of 0.5 cm×0.5 cm having four leads attached to their corner edges. Ohmic contact of the leads to the samples was tested by measuring a linear I-V curve.

Scanning Electron Microscope (SEM) studies were carried out with a LEO 982 scanning electron microscope equipped with a Schottky field-emission gun.

Cyclic voltammograms were recorded using an EG&G PAR Model 273 Potentiostat/Galvonostar connected to a three-electrode cell consisting of a fibril working electrode, a platinum gauze counter electrode and a standard Ag/AgCl reference electrode. The electrolyte was 38% sulfuric acid.

The equivalent series resistance (E.S.R.) of the test devices was measured using a fixed frequency RCL meter (Fluke PM6303) at 1 kHz. The specific capacitance was measured by a d.c. constant current discharging method.

Impedance analysis was carried out with a Solartron 11250 frequency response analyzer driving an EG&G PAR model 273 Potentiostat/Galvonostat at a dc bias of 0, 0,5 and 1V with 10 mV amplitude sinusoidal signal).

Certain characteristics of the three electrodes made from oxidized nanotubes have been summarized in Table I below.

Figure 6:
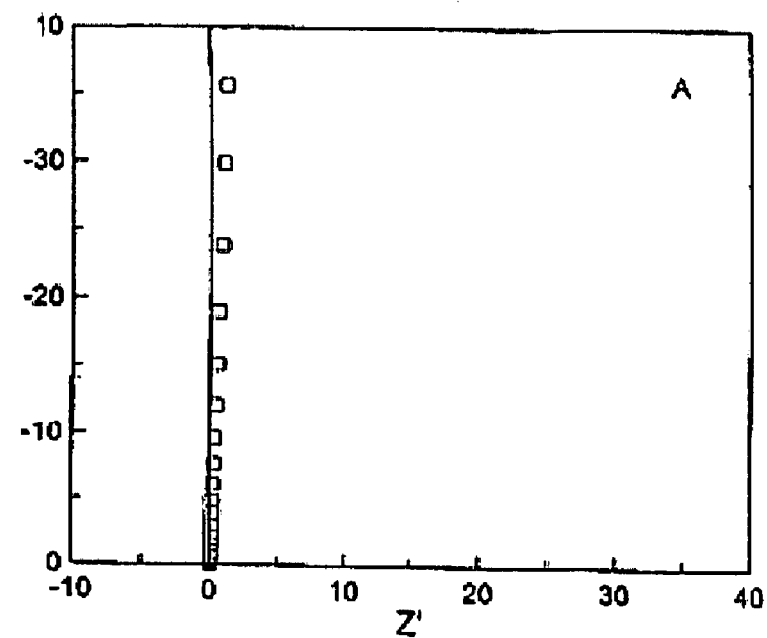
FIGS. 6A to 6C are each a complex-plane impedance plot, a Bode impedance plot, and a Bode angle plot, respectively, recorded from an electrochemical capacitor fabricated from electrodes prepared from multiwalled carbon nanotubes oxidized according to methods of the invention.
Figure 6:
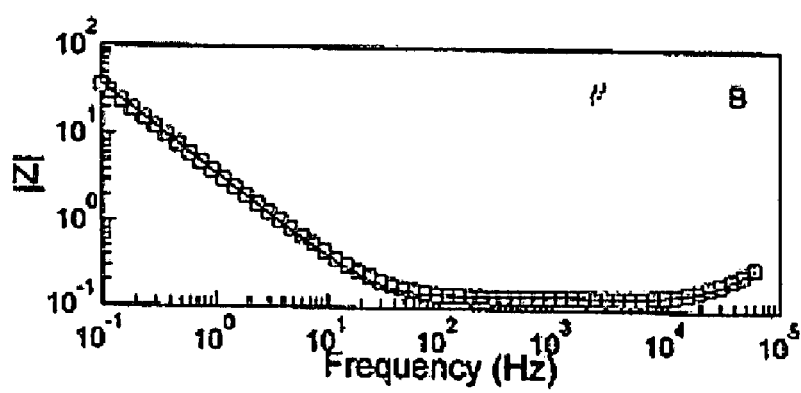
Figure 6:
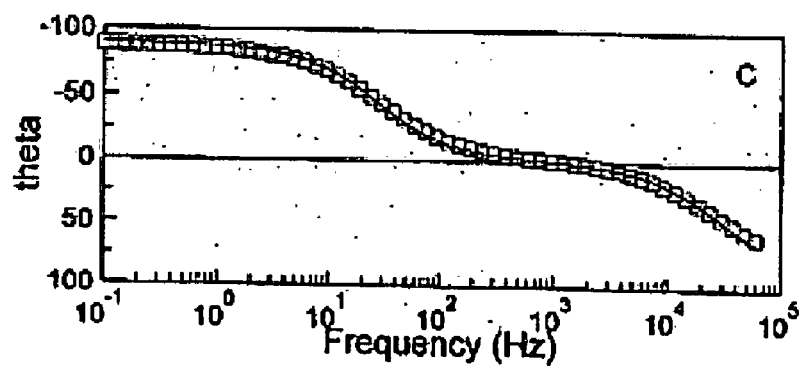

For all three devices, more than 61% of the stored energy was available for use at a frequency of one kHz. The frequency responses of the three devices were almost identical. FIGS. 6A-C show frequency response analysis result of the test device fabricated from sample 1 (Table I). The electrodes functioned like a non-porous, planar electrode. This was evidenced (FIGS. 6A,-6C) in the complex-plane impedance plots in which no clear "knee" point was present, and further in the Bode angle plot, up to 10 Hz, showing a near −90° phase angle for an ideal capacitor.

As illustrated by the foregoing description and examples, the invention has application in the formulation of a wide variety of oxidized nanofibers.

The terms and expressions which have been employed are used as terms of description and not of limitations, and there is no intention in the use of such terms or expressions of excluding any equivalents of the features shown and described as portions thereof, it being recognized that various modifications are possible within the scope of the invention.

We claim:

1. A method of oxidizing multiwalled carbon nanotubes having a diameter no greater than 1 micron, said method comprising growing multiwalled carbon nanotubes on a supported catalyst, said supported catalyst comprising a catalyst and a catalyst support, contacting said multiwalled carbon nanotubes with a gas-phase oxidizing agent selected from the group consisting of $CO_2$, $O_2$, steam, $N_2O$, $NO$, $NO_2$, $O_3$, $ClO_2$ and mixtures thereof under conditions sufficient to form oxidized nanotubes which exhibit upon titration an acid titer of from 0.05 to about 0.6 meq/g, wherein said oxidized nanotubes include said supported catalyst.

2. The method of claim 1, wherein said oxidation occurs on the exterior side walls of said multiwalled carbon nanotubes.

3. The method of claim 1, wherein said oxidation occurs on the surface of said multiwalled carbon nanotubes.

4. The method of claim 1, wherein said diameter of said carbon nanotubes is from 2 to 100 nanometers.

5. The method of claim 1, wherein said diameter of said carbon nanotubes is from 3.5 to 75 nanometers.

6. The method of claim 1, wherein said multiwalled carbon nanotubes include at least a plurality of graphitic layers that are substantially parallel to the axis of said nanotubes.

7. The method of claim 1, wherein said multiwalled carbon nanotubes are substantially cylindrical, graphitic nanotubes having a length to diameter ratio of greater than 5 and a diameter of less than 0.1 micron.

8. The method of claim 1, wherein said multiwalled carbon nanotubes are substantially cylindrical, free of a continuous pyrolytically deposited carbon overcoat, the projection of the graphite layers on said nanotubes extending for a distance of at least two nanotube diameters.

TABLE I

| Samples | Treatment | Weight loss (%) | Thickness | E.S.R. | Density (g/cc) | Resistivity (Ω-cm) | $C_p$ (F/g) | $C_{p, 1 kHz}$ |
|---|---|---|---|---|---|---|---|---|
| A | Wet air, 4 hr | 7.1 | 0.0016" | 0.074 | 0.48 | $1.8 \times 10^{-2}$ | 33.14 | 26.53 |
| B | Wet air, 5 hr | 12.4 | 0.0015" | 0.041 | 0.51 | $1.5 \times 10^{-2}$ | 35.85 | 22 |
| C | Wet air, 8 hr | 68 | 0.0016" | 0.036 | 0.52 | $2.5 \times 10^{-2}$ | 35.44 | 24.25 |

E.S.R.—Equivalent series resistance
Cp—Specific capacitance
Cp, 1 kHz—specific capacitance at 1 kHz.

9. The method of claim 1, wherein said multiwalled carbon nanotube is a fishbone fibril.

10. The method of claim 1, wherein said oxidized nanotubes comprise moieties selected from the group consisting of carbonyl, carboxyl, aldehyde, phenolic, hydroxy, esters, lactones and derivatives thereof.

11. The method of claim 1, wherein said oxidized nanotubes exhibit upon titration an acid titer from 0.1 to 0.4 meq/g.

12. The method of claim 1, wherein said oxidized carbon nanotubes exhibit a weight loss of from 1% to 60% by comparison to unoxidized carbon nanotubes.

13. The method of claim 1, wherein said oxidized carbon nanotubes exhibit a weight loss from 2% to 15% by comparison with said unoxidized carbon nanotube.

14. The method of claim 1, wherein said gas-phase oxidizing agent is diluted with an inert diluant selected from the group consisting of nitrogen, noble gases and mixtures thereof.

15. The method of claim 1, wherein said gas-phase oxidizing agent is near critical or supercritical water.

16. The method of claim 1, wherein said oxidizing of said multiwalled carbon nanotubes with said gas-phase oxidizing agent is performed for a period of time from about 0.1 hours to about 24 hours.

17. The method of claim 1, wherein said oxidizing of said multiwalled carbon nanotubes with said gas-phase oxidizing agent is performed for a period of time from about 1 hour to about 8 hours.

18. The method of claim 1, wherein said oxidizing of said multiwalled carbon nanotubes with said gas-phase oxidizing agent is performed in a temperature range from about 200° C. to about 600° C. and in a range of partial pressure of said oxidizing agent from about 1 torr to about 7600 torr.

19. The method of claim 18, wherein the partial pressure range of the gas-phase oxidizing agent is from 5 torr to 760 torr.

20. The method of claim 1, wherein said oxidizing of said multiwalled carbon nanotubes with said gas-phase oxidizing agent is performed in a temperature range from about 400° C. to about 900° C. and in a range of partial pressure of the oxidizing agent from about 1 torr to about 7600 torr whenever said gas-phase oxidizing agent is $CO_2$ or steam.

21. The method of claim 20, wherein the partial pressure range of the gas-phase oxidizing agent is from 5 torr to 760 torr.

22. The method of claim 1, further comprising a secondary treatment step of said oxidized nanotubes with a reactant suitable to react with moieties of said oxidized nanotubes thereby adding at least a secondary group onto the surface of said oxidized nanotubes.

23. The method of claim 22, wherein said additional secondary group is selected from the group consisting of an alkyl and aryl silane.

24. The method of claim 22, wherein said additional secondary group is a fluorocarbon.

25. The method of claim 1, further comprising dispersing said surface-oxidized nanotubes into a liquid medium.

26. The method of claim 25, wherein after being dispersed in said liquid medium, said oxidized nanotubes are filtered and dried to form a mat.

27. The method of claim 26, further comprising heating said mat from 200° C. to 900° C.

28. The method of claim 26, further comprising forming said mat into an electrode.

29. A method for producing a network of carbon nanotubes comprising the steps of:
(a) growing multiwalled carbon nanotubes on a supported catalyst, said supported catalyst comprising a catalyst and a catalyst support,
(b) oxidizing said carbon nanotubes with a gas-phase oxidizing agent selected from a group consisting of $CO_2$, $O_2$, steam, $N_2O$, NO, $NO_2$, $O_3$, $ClO_2$ and mixtures thereof under conditions sufficient to form oxidized nanotubes, wherein said oxidized nanotubes include said supported catalyst.
(c) subjecting said oxidized nanotubes to conditions sufficient to cause crosslinking.

30. The method of claim 29, wherein said conditions include heating said oxidized nanotubes in air in a temperature range from 200° C. to 600° C.

31. The method of claim 26, wherein said conditions include heating said oxidized nanotubes in an inert atmosphere in a temperature range from 200° C. to 2000° C.

32. A method for producing a network of functionalized carbon nanotubes comprising the steps of:
(a) growing carbon nanotubes on a supported catalyst, said supported catalyst comprising a catalyst and a catalyst support,
(b) oxidizing said carbon nanotubes with a gas-phase oxidizing agent selected from a group consisting of $CO_2$, $O_2$, steam, $N_2O$, NO, $NO_2$, $O_3$, $ClO_2$ and mixtures thereof under conditions sufficient to form oxidized nanotubes, wherein said oxidized nanotubes include said supported catalyst;
(c) treating said oxidized nanotubes with a reactant suitable to react with moieties of said oxidized nanotubes thereby adding at least a secondary group onto the surface of said oxidized nanotubes;
(d) further contacting said nanotubes bearing secondary groups with an effective amount of crosslinking agent.

33. The method of claim 32, wherein said crosslinking agent is selected from the group consisting of a polyol and polyamine.

34. The method of claim 33, wherein said polyol is a diol and said polyamine is a diamine.

35. The method of claim 29, wherein said oxidized nanotubes comprise moieties selected from the group consisting of carbonyl, carboxyl, aldehyde, ketone, hydroxy, phenolic, esters, lactones and derivatives thereof.

36. A method of treating aggregates of carbon nanotubes which comprises
growing aggregates of carbon nanotubes on a supported catalyst, said supported catalyst comprising a catalyst and a catalyst support,
contacting said aggregates with an gas-phase oxidizing agent selected from a group consisting of $CO_2$, $O_2$, steam, $N_2O$, NO, $NO_2$, $O_3$, $ClO_2$ and mixtures thereof under conditions sufficient to oxidize said carbon nanotube aggregates which exhibit upon titration an acid titer of from 0.05 to about 0.6 meq/g,
wherein said oxidized carbon nanotube aggregates include said supported catalyst.

37. The method of claim 36, wherein said aggregates have a macromorphology selected from the group consisting of bird nests, combed yarn and open net aggregates.

38. The method of claim 36, wherein said aggregate particles have an average diameter of less than 50 microns.

39. The method of claim 36, wherein said carbon nanotubes are substantially cylindrical with a substantially constant diameter are multiwalled having graphitic layers concentric with the nanotube axis and are substantially free of pyrolytically deposited carbon.

40. The method of claim 36, wherein said carbon nanotubes are a fishbone fibril.

41. The method of claim 36, wherein said treated aggregates resemble a weathered rope.

42. A method for preparing a rigid porous structure comprising the steps of:

(a) oxidizing a multiplicity of multiwalled carbon nanotubes according to the method of claim 1 to oxidized nanotubes;
(b) dispersing said oxidized nanotubes in a medium to form a suspension;
(c) separating said medium from said suspension to form a porous structure of entangled oxidized nanotubes wherein said nanotubes are interconnected to form a rigid porous structure.

43. The method of claim 42, wherein said multiwalled carbon nanotubes are uniformly and evenly distributed throughout said structure.

44. The method of claim 42, wherein said carbon nanotubes are in the form of aggregate particles selected from the groups consisting of aggregate particles resembling a shape selected from the group consisting of bird nest, combed yarn and open net.

45. The method of claim 42, wherein said oxidized nanotubes are in the form of aggregate particles resembling a weathered rope.

46. The method of claim 42, further comprising heating said suspension in air to a temperature in a range from about 200° C. to about 600° C. thereby forming said rigid porous structure.

47. The method of claim 42, further comprising heating said suspension in an inert gas to a temperature in a range from about 200° C. to about 2000° C. thereby forming said rigid porous structure.

48. The method of claim 42, wherein said medium is water or organic solvents.

49. The method of claim 42, wherein said medium comprises a dispersant selected from the group consisting of alcohols, glycerin, surfactants, polyethylene glycol, polyethylene imines and polypropylene glycol.

50. The method of claim 42, wherein said suspension further comprises gluing agents selected from the group consisting of cellulose, carbohydrate, polyethylene, polystyrene, nylon, polyurethane, polyester, polyamides and phenolic resins.

51. The method of claim 42, further comprising the steps of:
(a) forming said rigid porous structure into a mat; and
(b) forming said mat into an electrode.

* * * * *